(12) United States Patent
Itakura

(10) Patent No.: US 8,070,603 B2
(45) Date of Patent: Dec. 6, 2011

(54) NETWORK GAME SYSTEM, NETWORK GAME SERVER, AND NETWORK GAME TERMINAL

(75) Inventor: Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1565 days.

(21) Appl. No.: 10/228,510

(22) Filed: Aug. 27, 2002

(65) Prior Publication Data

US 2003/0060285 A1   Mar. 27, 2003

(30) Foreign Application Priority Data

Aug. 30, 2001 (JP) ................................. 2001-261815

(51) Int. Cl.
*A63F 13/00* (2006.01)
(52) U.S. Cl. ........................................................ 463/42
(58) Field of Classification Search .......... 463/1, 40–42; 709/203, 248
See application file for complete search history.

(56) References Cited

U.S. PATENT DOCUMENTS

| | | | | |
|---|---|---|---|---|
| 4,570,930 A | * | 2/1986 | Matheson | 463/41 |
| 5,470,079 A | * | 11/1995 | LeStrange et al. | 463/25 |
| 5,558,339 A | * | 9/1996 | Perlman | 463/42 |
| 5,899,810 A | * | 5/1999 | Smith | 463/42 |
| 6,352,479 B1 | * | 3/2002 | Sparks, II | 463/42 |
| 6,415,317 B1 | * | 7/2002 | Yelon et al. | 709/205 |
| 6,868,434 B1 | * | 3/2005 | Terranova et al. | 709/203 |
| 6,874,029 B2 | * | 3/2005 | Hutcheson et al. | 709/227 |
| 2002/0129096 A1 | * | 9/2002 | Mansour et al. | 709/203 |
| 2002/0184391 A1 | * | 12/2002 | Phillips | 709/248 |

FOREIGN PATENT DOCUMENTS

| | | |
|---|---|---|
| JP | 02-005669 | 1/1990 |
| JP | 05-233485 | 9/1993 |
| JP | 2001-198363 | 7/2001 |

\* cited by examiner

*Primary Examiner* — Melba Bumgarner
*Assistant Examiner* — Thomas H Henry
(74) *Attorney, Agent, or Firm* — Robert J. Depke; Rockey, Depke & Lyons, LLC

(57) ABSTRACT

Disclosed is a network game system in which a time lag is adjusted, using game terminal type information such as its ID number. A network game server comprises a lag adjusting program and a database to be referenced to execute the lag adjusting program. On the network, data from game terminals is transmitted in packets to the network game server where concentrated management is made of all packet data as user information. Different transmission time lags predetermined for the product types of the game terminals that are expected to connect to the server are stored into the database beforehand. When the server receives packet data from a terminal device having an EUI-64 identifier, the appropriate transmission time lag is read, based on the identifying information.

12 Claims, 4 Drawing Sheets

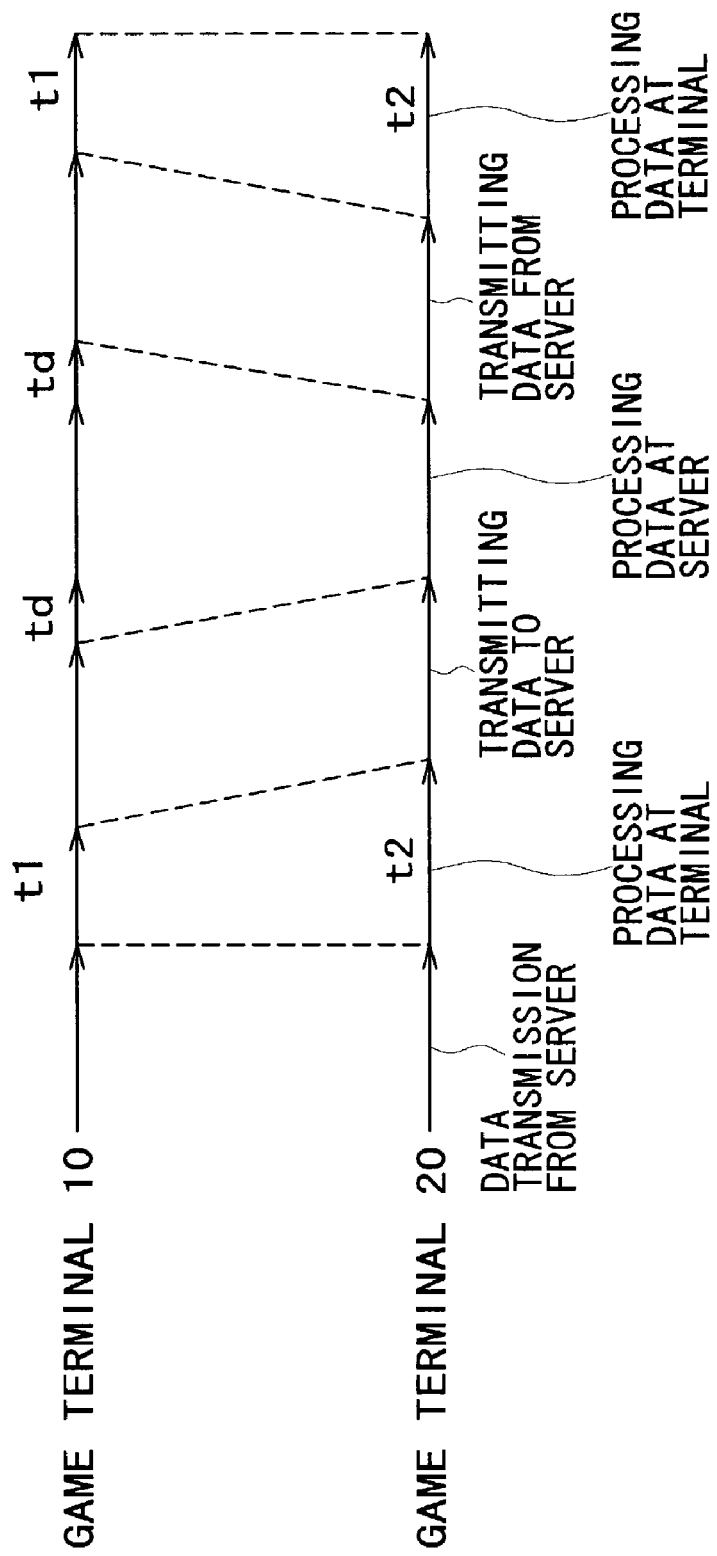

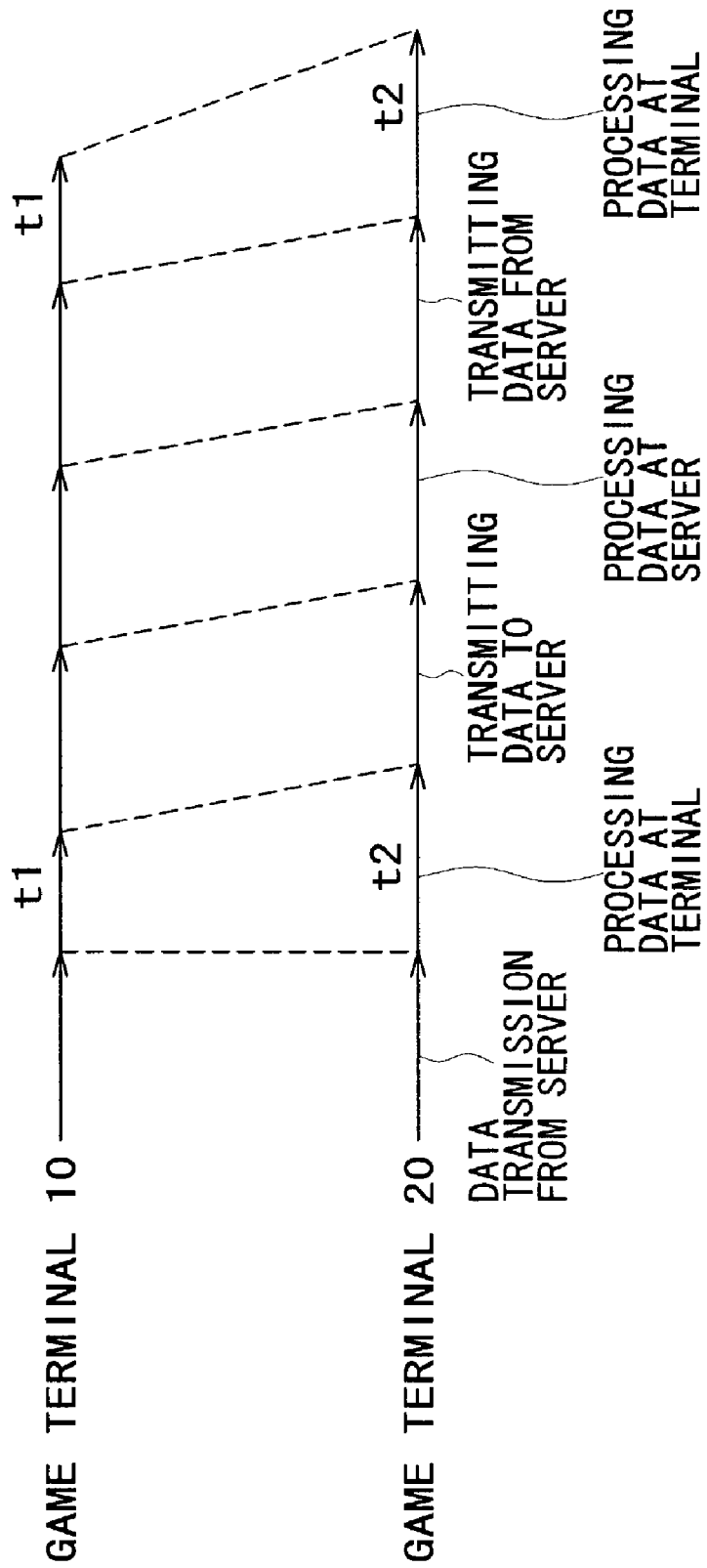

NETWORK GAME SYSTEM, NETWORK GAME SERVER, AND NETWORK GAME TERMINAL

This application claims priority to Japanese Patent Application Number JP2001-261815 filed Aug. 30, 2001, which is incorporated herein by reference.

BACKGROUND OF THE INVENTION

1. Field of the Invention

The present invention relates to a network game system including a plurality of network game terminals each having different throughput and a network game server which stores network game applications and processes packet data transmitted from the network game terminals, the network game terminals and the network game server being connected via a network, and a network game server and a network game terminal that can be used to be constituents of such a system.

2. Description of the Related Art

A real-time network game system has heretofore been known in which a server has game management software and terminals have game software. When the users of the terminals play a game by operating game software on their terminals, data is generated on each terminal, and, out of the data, at least data required for other users to play the game is transmitted to the server. Other users having access to the server read the data transmitted to the server. Based on the data thus read, the remote users play the game together concurrently, using the game software stored in their terminals. This system is disclosed in JP-A No. 6700/1997. As another network game system, a game system nursing a virtual living thing via a network is disclosed in JP-A No. 296271/2000. Client terminals access a server via a computer network and nurse a virtual living thing in a virtual space provided by the server.

Such gaming via a network enables a great number of people to play a game simultaneously and information for all users concentrates at a game server on the network. For a network game for which the real-time processing ability of the machine used to participate in it is essential requirement, difference in throughput across the participants' game terminals brings about unfairness across the game players. For example, when playing a kind of fight game across on-line participants, a game player using a machine with a higher CPU processing speed would always be advantageous in getting points of the game.

FIG. 4 is a timing chart representing the operations of two game terminals over time and their CPUs differ in processing speed. A game terminal 10 has a CPU whose processing speed is higher than the CPU of a game terminal 20. The timing chart represents the operation progress in a cycle; the game terminals 10 and 20 process data received from the server, return the result of processing the data to the server, and receive the result of the server processing of the data from the server. Time t1 in which the game terminal 10 processed the data is shorter than time t2 in which the game terminal 20 processed the corresponding data. Therefore, even if it takes equal time to transmit data from the game terminals 10 and 20 to the server, the server starts to process the data received from the game terminal 10 earlier. Accordingly, time difference between the operations of the two game terminals 10 and 20 gradually increases until they receive the result of the server processing of the data from the server.

As means for eliminating the unfairness by throughput difference across game terminals, an idea was proposed that the server be provided with a function of adjusting a lag when transmitting packet data to the participants' game terminals, considering the processing speed of the components such as CPU of the game terminals. That is, the game server initially measures the throughput of a game terminal used by each player and stores data transmission time lags according to the throughput of each game terminal in its database. When the server transmits packet data to each game terminal, it keeps the data in a buffer for a time equaling the time lag set per terminal. In this way, the server can adjust the time lag of data transmission.

With the increasing number of players participating in a network game, however, the following problem arose. The server need to know the processing speeds of all game terminals connected to the network and it takes more time to measure them. Moreover, creating a database for determining a time lag for each terminal takes time.

Most of the game terminals are products supplied from only a limited number of manufactures thereof and the number of types thereof is not so many. Notwithstanding, the server calculates and stores the time lags for all game terminals. This was inefficient. Moreover, each time a game terminal transmits data to the server, access to the database and reading the adjustment time lag set for the terminal must be performed and the time consumed for this is undesirable.

Furthermore, an extensive network requires memory space expansion for creating the database, which posed a problem of great costs of database provision.

SUMMARY OF THE INVENTION

The object of the present invention is to provide a network entertainment system that is operated to adjust the time lag, using type information such as ID numbers of network entertainment apparatuses such as game terminals, and its constituents—i.e. a network entertainment apparatus such as a network game server, and network entertainment apparatuses such as a network game terminal.

In order to achieve the object, a network entertainment system is preferably provided that includes a plurality of first network entertainment apparatuses each having different throughput and a second network entertainment apparatus which stores a plurality of network entertainment application and processes packet data transmitted from the first network entertainment apparatuses. The first network entertainment apparatuses and the second network entertainment apparatus being connected via a network. The second network entertainment apparatus comprises: a throughput database in which processing speeds according to type information for said first network entertainment apparatuses are stored; and lag adjustment means for adjusting a transmission time lag per packet data that is transferred from/to each of said first network entertainment apparatuses, according to said type information transmitted from said first network entertainment apparatuses.

In the network entertainment system of the present invention, the transmission time lag is determined from one of the processing speeds stored in said throughput database.

According to the network entertainment system of the present invention, the time lag due to data processing speed that is intrinsic to each of the first entertainment apparatuses is adjusted, using a first entertainment apparatus product type information such as its ID number. Thus, network game participants using different types of terminals each having different throughput can enjoy the same network game fairly.

According to the second entertainment apparatus and the first entertainment apparatuses of the present invention, it is sufficient to retain only the first entertainment apparatus product type information and associated time lags in a database. Thus, a simpler network entertainment system with reduced memory space requirements can be constructed.

Other and further objects, features and advantages of the invention will appear more fully from the following description.

BRIEF DESCRIPTION OF THE DRAWINGS

FIG. 3 is a timing chart of exchanging packets between the network game server and game terminals; and FIG. 4 is a timing chart representing the operations of two game terminals over time and their CPUs differ in processing speed, according to a prior art system for playing games via a network.

DETAILED DESCRIPTION OF THE PREFERRED EMBODIMENTS

The invention now is described fully hereinafter with reference to the accompanying drawings, in which preferred embodiments of the invention are shown.

Figure 1:
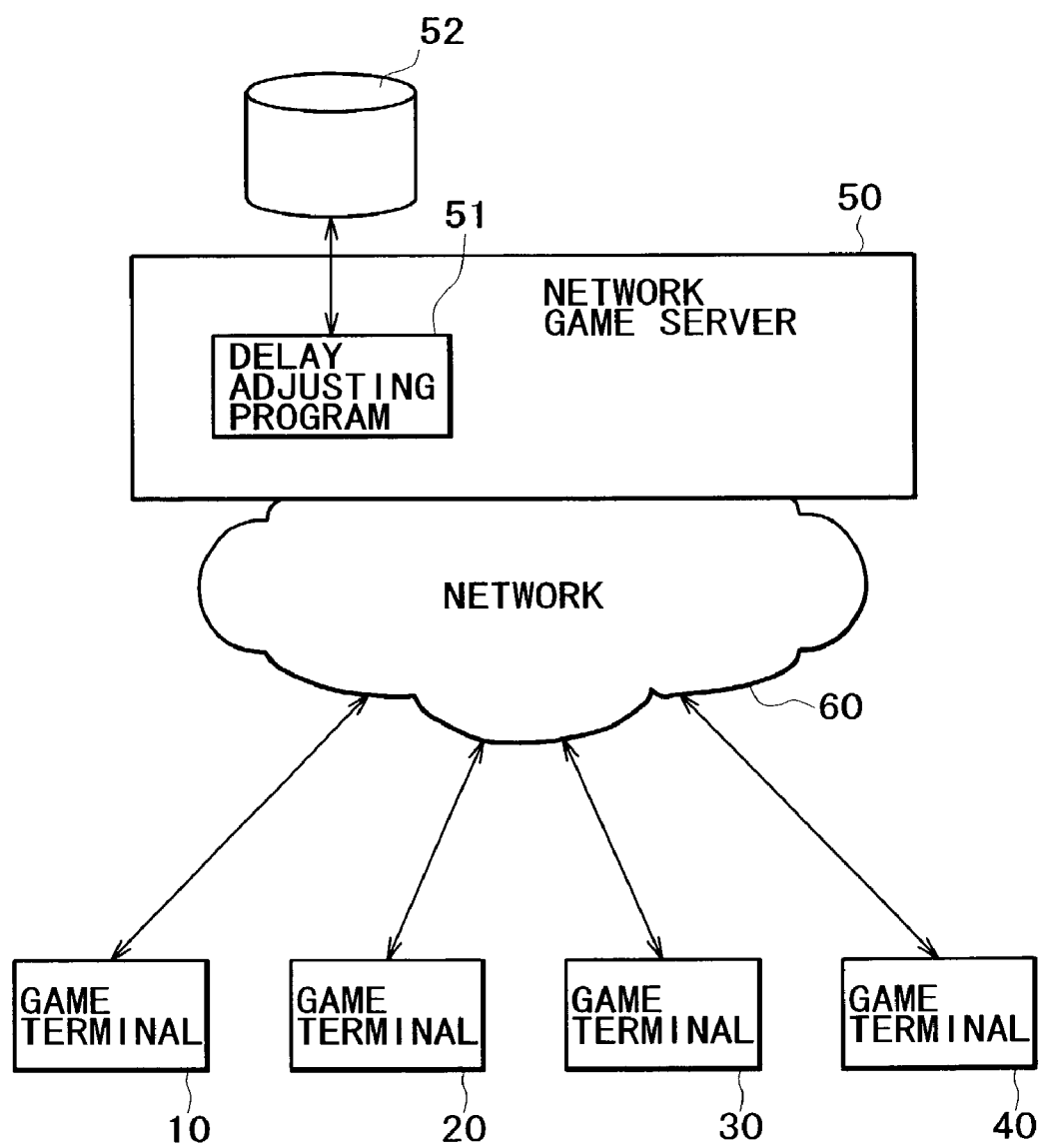
FIG. 1 is a diagram showing the configuration of a network game system according to the invention.

FIG. 1 is a diagram showing the configuration of a network game system according to the invention. Network game terminals (hereinafter referred to as game terminals) 10 through 40 are connected to the same network game server 50 via a network 60. The game terminals 10 through 40 each have different performance. Assume that the game terminal 10 is, for example, a game terminal product of type a1 supplied by manufacturer A, the game terminal 20 is, for example, a game terminal product of type b1 supplied by manufacturer B, the game terminal 30 is, for example, a game terminal product of type c1 supplied by manufacturer C, and the game terminal 40 is, for example, a game terminal product of type a2 supplied by manufacturer A.

The network game server 50 has a lag adjusting program 51 and a database 52 that is referenced to execute the lag adjusting program 51. On the network 60, data from the game terminals 10 through 40 is transmitted in packets to the network game server 50 where concentrated management is made of all packet data as user information. Data processed by the server is transmitted again across the network 60 to the game terminals 10 through 40.

On the network 60, each of the game terminals 10 through 40 connected thereto is assigned a network address pursuant to the Internet Protocol version 6 (IPv6). Unlike the IPv4 addressing using four sets of three digits of decimal numbers, which has been applied as a standard Internet protocol, the IPv6 addressing has extended an IP address to 128 bits in length and thus can make the number of connectable nodes increase drastically. Although only four game terminals 10 through 40 are shown in FIG. 1, by the IPV6 addressing, 64 bits of an IP address are assigned for interface ID and it is possible to make address assignments to almost an unlimited number of terminal devices and connect them to the network game server 50. As the interface ID of 64 bits, a 64-bit identifier EUI-64 of IEEE can be used.

The lag adjusting program 51 is a program for adjusting the transmission time lag per packet data, according to game terminal product type information that is transmitted as packet data from the game terminals 10 through 40. For example, 24 bits of the EUI-64 identifier are set to designate a manufacturing company ID by which a game terminal product type can be identified. Accordingly, different transmission time lags predetermined for the product types of the game terminals that are expected to connect to the server are stored into the database 52 beforehand. When the server receives packet data from a terminal device to which an EUI-64 identifier was assigned, the appropriate transmission time lag can be read, based on the identifying information.

Then, the operation of the network game server will be explained.

Figure 2:
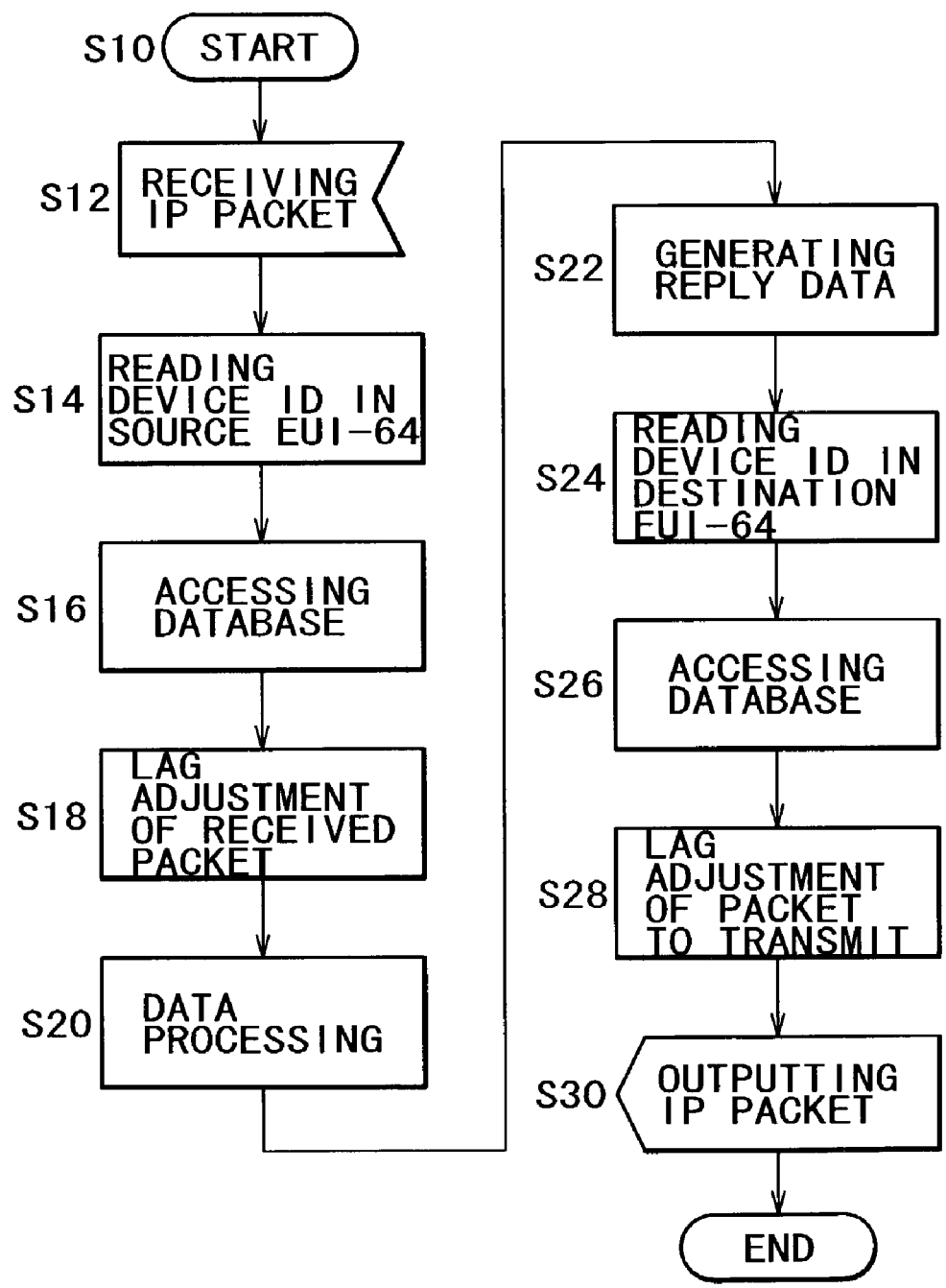
FIG. 2 is a flowchart for explaining the operation of a network game server.

FIG. 2 is a flowchart for explaining the operation of the network game server.

At step S10, the network game server 50 starts operation. In step S12, the server receives an IP packet from any of the game terminals 10 through 40 across the network 60. The source of the IP packet is identified by the IPv6 address on the Internet included in the packet. Upon the reception of the IP packet, in step S14, the server reads the device ID designated in the source EUI-64 identifier included in the packet and knows the manufacturing company name and the product number (identifying the model) of the game terminal that transmitted the packet data over the network 60.

In step S16, the server accesses the location corresponding to the device ID on the database 52 and reads the transmission time lag stored in that location. In step S18, the server makes a lag adjustment of the received packet, according to the thus read transmission time lag. In step S20, the server executes a sequence of data processing by the appropriate network game application for the data in the received packet that was lag adjusted.

In step S22, the server generates reply data, according to the result of the processing by the network game application. In step S24, the server reads the device ID of a destination game terminal of the thus generated data. A specific terminal may be specified as the destination or a plurality of terminals may be specified as the destinations. Again, the server accesses the location corresponding to the device ID on the database 52 (step S26), reads the transmission time lag stored in that location, and makes a lag adjustment of the replay data packet to transmit, according to the thus read transmission time lag (step S28). If the reply data packet is sent back to the same terminal, this transmission time lag is equal to that retrieved in the step S16 before the game processing. By temporarily storing the transmission time lag once retrieved, the step S26 can be omitted.

Finally, in step S30, the server outputs the reply IP packet to the network 60.

FIG. 3 is a timing chart of exchanging packets between the network game server and the game terminals.

Now, assume that the game terminal 10 has the highest processing speed among the terminals connectable to the server and time t1 in which the game terminal 10 processed data is shorter than time t2 in which the game terminal 20 processed the corresponding data. Even if data is transmitted simultaneously from the network game server 50 to the game terminals 10 and 20, because of the data processing time difference between t1 and t2 that are intrinsic to the game terminals 10 and 20, respectively, the time to transmit the data from the game terminal 20 to the network game server 50 lags. To make the network game server 50 start processing the data from both game terminals 10 and 20 at the same time, under the control of the lag adjusting program 51, the start of processing of the packet data from the game terminal 10 is delayed by a time lag td (equaling t2−t1) that is marked by a bold arrow. Thus, the network game server 50 starts to process the data from both game terminals at the same time.

Furthermore, when the server finally transmits the data processed by it to the game terminals 10 and 20 again, it reads the identification number information of the network game terminal 10 from the destination address of the packet data to transmit and determines the transmission time lag, so that the time to transmit the packet data to the game terminal 10 is delayed by a time lag td (equaling t2−t1) that is marked by a bold arrow. In this way, even if game players participate in a network game, using their terminals each having different processing speed, they can enjoy the game fairly.

Using the above-described network game server, it is sufficient to store only the processing speeds and associated time lags according to the limited types of terminal devices into the database 52. Before starting the game service, it becomes unnecessary to measure the operation throughput of all terminals connectable to the server and map the ID per game player such as the IP address of its terminal to the adjustment time lag set for it for management, which prior art network game systems would do. Thus, the network game server need not to have a complex protocol for communicating game player ID and device throughput information. Even if game terminal products supplied by different manufacturers are used to play a game via a network, it is sufficient to register terminal type information and the adjustment time lag per type into the database 52. Network game participants using different types of terminals each having different throughput can enjoy the same network game fairly.

The foregoing invention has been described in terms of preferred embodiments. However, those skilled in the art will recognize that many variations of such embodiments exist. Such variations are intended to be within the scope of the invention and the appended claims.

What is claimed is:

1. A network entertainment system comprising
a plurality of first network apparatuses each having different performance characteristics, and
a second network apparatus which runs a network application and processes packet data transmitted from said plurality of first network apparatuses,
said first network apparatuses and said second network apparatus being connected via a network,
wherein said second network apparatus includes a lag adjustment database in which lag adjustments for varying types of first network apparatuses are stored, and lag adjustment means for adjusting a time lag for processing and transmitting data packets, wherein each data packet received by the second network apparatus is processed by the second network apparatus only after storing information from the received data packet for an amount of time corresponding to the time lag determined by the lag adjustment means for the first network apparatus from which the received data packet was transmitted, the data packet is processed by the second network apparatus after waiting the amount of time determined by the lag adjustment means, the processing causing the generation of a data packet to be transmitted by the second network apparatus and further wherein the data packet to be transmitted by the second network apparatus is transmitted from the second network apparatus only after an amount of delay determined by the lag adjustment means for the first network apparatus to which the data packet is to be transmitted;
wherein each first network apparatus transmits an identifier code to the second network apparatus identifying a type of network apparatus, and the time lag adjustment amount that the second network apparatus applies to packet data traveling to and/or from a particular first network apparatus is determined by retrieving time lag information from the database based exclusively on the identifier code designating a type of network apparatus from each first network apparatus, without analysis of any actual data transmission to and/or from the first network apparatus.

2. The network entertainment system as claimed in claim 1, wherein said lag adjusting means obtains the identification type data of one of said first network apparatuses from the source address of packet data received, determines the transmission time lag to apply to the packet data, and changes the time to start the execution of said network application on said second network apparatus accordingly.

3. The network entertainment system as claimed in claim 1, wherein said lag adjusting means obtains the identification type data of one of said first network apparatuses from the destination address of packet data to transmit, determines the transmission time lag to apply to the packet data so that packet data transmitted from said second network apparatus arrives at said first network apparatuses at substantially the same time.

4. The network entertainment system as claimed in claim 1, wherein each of said first network apparatuses has a network address pursuant to an Internet Protocol version 6(IPv6) including type identification information specific to a first entertainment apparatus product type.

5. The network entertainment system of claim 1, further wherein: said first network entertainment apparatuses each having a network address pursuant to the Ipv6 including type identification information specific to a first entertainment apparatus product type.

6. The network entertainment system as claimed in claim 1, wherein said lag adjustment means adjusts a time lag for data packets transferred from the first network apparatuses prior to processing of the data packets.

7. The network entertainment system as claimed in claim 6, wherein first network apparatuses having increased relative performance characteristics have their packet data subjected to increased lag adjustment relative to first network apparatuses having decreased relative performance characteristics, based on the performance characteristics of network apparatus types stored in the performance characteristics database.

8. The network entertainment system as claimed in claim 1, wherein said lag adjustment means adjusts a time lag for each packet data as it is transferred to each of said first network apparatuses.

9. The network entertainment system as claimed in claim 1, wherein first network apparatuses having increased relative performance characteristics have their packet data subjected to increased lag adjustment relative to first network apparatuses having decreased relative performance characteristics, based on the performance characteristics of network apparatus types stored in the performance characteristics database.

10. A primary network entertainment apparatus which stores a network entertainment application and processes packet data transmitted from and/or to a plurality of first network entertainment apparatuses each having different performance characteristics, said primary network entertainment apparatus including: "a microprocessor executing machine instructions corresponding to a computer program stored in electronic memory of the primary network entertainment apparatus, which causes" adjusting of a time lag for processing and transmitting data packets such that a greater lag adjustment is applied to data packets received from and transmitted to a first network entertainment apparatus type which exhibits greater relative performance characteristics compared to a first network entertainment apparatus type which exhibits lower relative performance characteristics, and wherein the time lag is based exclusively on an identifier information designating a type of network apparatus that is transmitted from each first network apparatus, without analysis of any actual data transmission to and/or from the first network apparatus, wherein each data packet received by the primary network entertainment apparatus is processed by the primary network entertainment apparatus only after storing information from the received data packet for an amount of time . corresponding to the time lag determined by the lag adjustment means for the first network apparatus from which the received data packet was transmitted, and further wherein a data packet to be transmitted by the primary network apparatus is transmitted from the primary network apparatus only after an amount of delay determined by the lag adjustment means for the first network apparatus to which the data packet is to be transmitted.

11. The primary network entertainment apparatus as claimed in claim 10, wherein said computer program adjusts a time lag for each packet data as it is transferred to each of said first network apparatuses.

12. The primary network entertainment apparatus as claimed in claim 11, wherein said lag adjustment of outgoing packet data transferred to each of said first network apparatuses is effected by intentionally delaying the transmission of a packet data out of said second network apparatus.

* * * * *